(12) United States Patent
Bird et al.

(10) Patent No.: US 9,546,729 B2
(45) Date of Patent: Jan. 17, 2017

(54) ELECTRO-MECHANICAL ONE-WAY-CLUTCH AND METHOD OF OPERATION

(71) Applicant: Ford Global Technologies, LLC, Dearborn, MI (US)

(72) Inventors: Norman Jerry Bird, Plymouth, MI (US); Bradley Dean Riedle, Northville, MI (US); Ricardo Humberto Espinosa, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 14/728,181

(22) Filed: Jun. 2, 2015

(65) Prior Publication Data

US 2016/0356377 A1    Dec. 8, 2016

(51) Int. Cl.
  *F16H 61/02*    (2006.01)
  *F16D 28/00*    (2006.01)
  *F16H 61/12*    (2010.01)
  *F16D 41/08*    (2006.01)

(52) U.S. Cl.
  CPC .......... *F16H 61/0204* (2013.01); *F16D 28/00* (2013.01); *F16H 61/12* (2013.01); *F16D 41/08* (2013.01); *F16D 2500/70223* (2013.01); *F16H 2061/1276* (2013.01)

(58) Field of Classification Search
  None
  See application file for complete search history.

(56) References Cited

U.S. PATENT DOCUMENTS

| 3,773,156 A | 11/1973 | Nyquist |
| 4,440,277 A | 4/1984 | Thomson |
| 7,467,701 B2 | 12/2008 | Poy |
| 7,891,448 B2 | 2/2011 | Onderko et al. |
| 8,494,738 B2 * | 7/2013 | Lee ................ F16H 61/686 475/43 |
| 2010/0018786 A1 * | 1/2010 | Samie .............. B60K 17/02 180/65.6 |

FOREIGN PATENT DOCUMENTS

WO    2014055075 A1    4/2014

* cited by examiner

*Primary Examiner* — Ramya Burgess
*Assistant Examiner* — Mark Manley
(74) *Attorney, Agent, or Firm* — James Dottavio; Brooks Kushman P.C.

(57) ABSTRACT

A transmission utilizes an electro-magnetically actuated selectable one-way-clutch. The one-way-clutch prevents rotation of a transmission member in both directions when a current exceeds a threshold and permits rotation in only one direction otherwise. To prevent un-intended engagement, a switch interrupts the current unless a second current exceeds a threshold. In order to engage the one-way-clutch, both currents are set above their respective thresholds by a controller. In the event of a single fault such as a short circuit, the system continues to function normally. The controller may periodically test for a fault by intentionally setting one current above its threshold and the other below its threshold and determining the state of the one-way-clutch by measuring speeds of transmission elements.

14 Claims, 6 Drawing Sheets

ELECTRO-MECHANICAL ONE-WAY-CLUTCH AND METHOD OF OPERATION

TECHNICAL FIELD

This disclosure relates to the field of transmission systems. More particularly, the disclosure pertains to a transmission control system including a selectable one-way-clutch, an electric switch, and methods of controlling these devices via a controller.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

A common type of automatic transmission utilizes a collection of shift elements. Various subsets of the shift elements are engaged to establish the various speed ratios. A common type of shift element utilizes a clutch pack having separator plates splined to a housing and interleaved with friction plates splined to a rotating shell. When the separator plates and the friction plates are forced together, torque may be transmitted between the housing and the shell. A controller controls the torque capacity on such a friction clutch by adjusting the force squeezing the clutch pack. Friction clutches are capable of transmitting torque in the presence of relative speed between the separator plates and the friction plates. Some drag torque is transmitted even when a friction clutch is disengaged reducing efficiency.

Another type of shift element is a one-way-clutch. A one-way-clutch permits relative rotation between two races in one direction, but prevents relative rotation in the opposite direction. One-way-clutches have advantages and disadvantages relative to friction clutches. Shift quality is improved when the off-going element is a one-way-clutch because the clutch passively releases at the correct time. Generally, the parasitic drag of one-way-clutches is lower than that of friction clutches. However, one-way-clutches cannot transmit torque in the presence of relative rotation between the races. Some one-way-clutches are selectable. A selectable one-way-clutch (SOWC) can be actively controlled to be in one of multiple states which vary in terms of which directions of relative rotation are permitted. For example, a selectable one-way-clutch may permit relative rotation in one direction but not the other in one state and preclude relative rotation in both directions in another state. Like non-selectable one-way-clutches, selectable one-way-clutches are not capable of transmitting torque in the presence of relative rotation.

SUMMARY OF THE DISCLOSURE

A transmission includes a selectable one-way-clutch, a switch, and a controller. The selectable one-way-clutch is configured to prevent relative rotation between two transmission elements in response to a first current exceeding a first threshold and to permit relative rotation in only one direction in response to the first current being less than the first threshold. One of the elements may be a non-rotating transmission case. The switch is configured to interrupt the first current in response to a second current not exceeding a second threshold. The controller sets the state of the selectable one-way-clutch in response to manipulation of a shift lever by manipulating the first and second currents. Specifically, the controller may be programmed to engage the selectable one-way-clutch in response to selection of a reverse range by setting the first and second currents to levels exceeding the first and second thresholds respectively, and to dis-engage the selectable one-way-clutch in response to selection of a drive range by setting the first and second electrical currents to levels less than the first and second thresholds respectively. A first wire may electrically connect the controller to the selectable one-way-clutch while a second wire electrically connects the switch to the controller such that the first current flows through the first and second wires. In some embodiments, a third wire electrically connects the switch to the controller such that the second current flowing through the second and third wires. In other embodiments, a third wire electrically connects the switch to the controller while a fourth wire electrically connects the switch to the controller such that the second current flows through the third and fourth wires.

A method of operating a transmission includes responding to selection of a reverse range by engaging a selectable one-way-clutch and preparing for an upshift by disengaging the selectable one-way-clutch in one direction. The selectable one-way-clutch is engaged by regulating a first and a second current to levels exceeding first and second thresholds respectively. The selectable one-way-clutch is disengaged in one direction by regulating the first and second currents to levels less than the first and second thresholds respectively. The controller may test for a fault by regulating the first current to a first level exceeding the first threshold, regulating the second current to a second level less than the second threshold, and increasing a torque capacity of a friction clutch. If a transmission speed ratio reacts in a manner inconsistent with the selectable one-way-clutch being disengaged, an error code is set.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
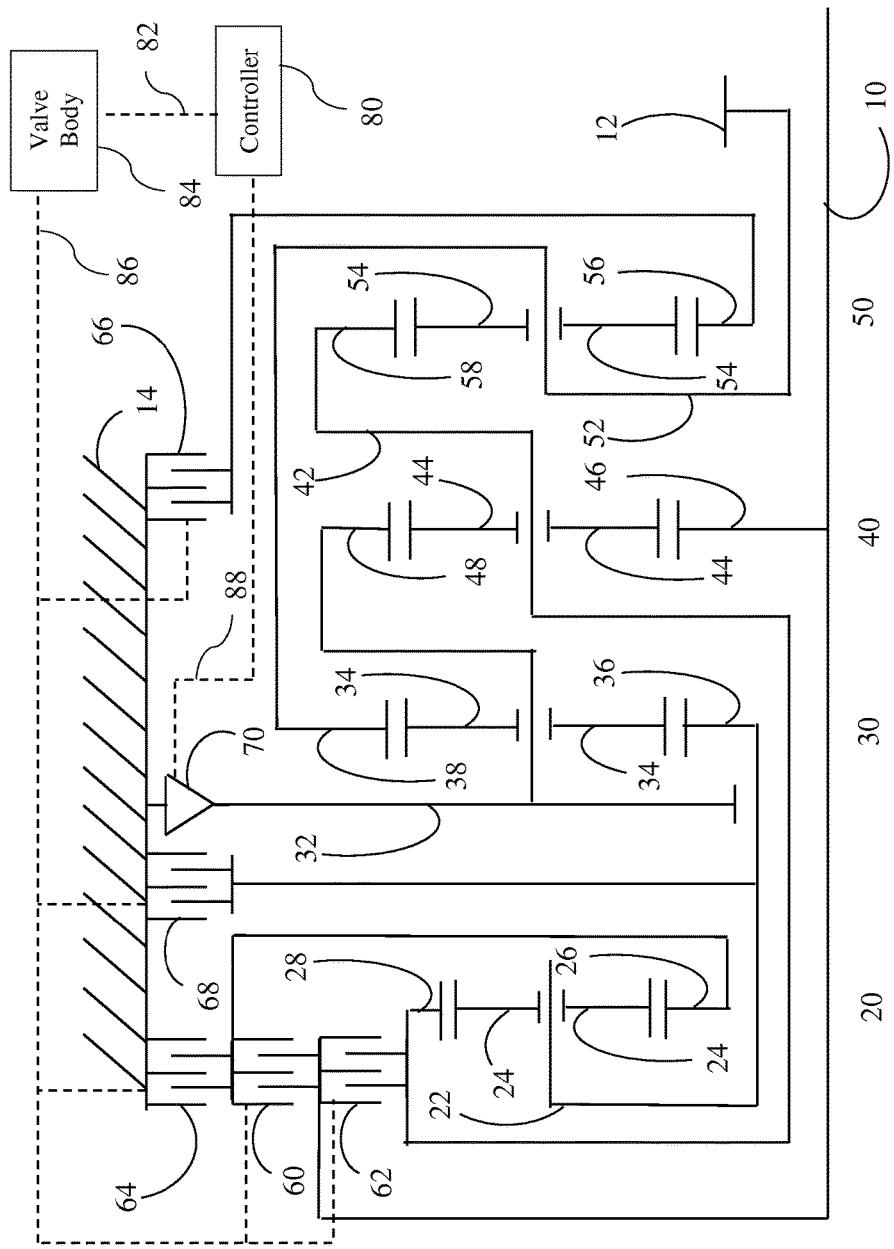
FIG. 1 is a schematic diagram of a transmission gearing arrangement.

A transmission gearing arrangement is illustrated schematically in FIG. 1. Mechanical connections are illustrated with solid lines, whereas control signals are indicated with dashed lines. Input shaft 10 is driven by an internal combustion engine, potentially via a launch device such as a torque converter. Output 12 drives the vehicle wheels, potentially via gearing and a differential. The various components of the gearing arrangement are supported within a transmission case 14 that is fixed to vehicle structure. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears 24 mesh with external gear teeth on a sun gear 26 and with internal gear teeth on a ring gear 28. Sun gear 26 and ring gear 28 are supported to rotate about the same axis as the carrier. Gear sets 30, 40, and 50 are similarly structured.

Sun gear 46 is fixedly coupled to input shaft 10. Ring gear 38 and carrier 52 are fixedly coupled to output 12. Carrier 22 is fixedly coupled to sun gear 36. Ring gear 28, carrier 42, and ring gear 58 are mutually fixedly coupled. Carrier 32 is fixedly coupled to ring gear 48. Clutch 62 selectively couples ring gear 28 to input shaft 10. Sun gear 26 is selectively coupled to input shaft 10 by clutch 60 and selectively held against rotation by brake 64. Brake 66 selectively holds sun gear 56 against rotation. Brake 68 selectively holds carrier 22 and sun gear 36 against rotation. Selectable one-way-clutch 70 has two states. In a disengaged state, selectable one-way-clutch 70 passively holds carrier 32 and ring gear 48 against rotation in one direction while permitting rotation in the other direction. In an engaged state, selectable one-way-clutch 70 holds carrier 32 and ring gear 48 against rotation in both directions.

As shown in Table 1, engaging shift elements 60-70 in combinations of two establishes eight forward speed ratios and one reverse speed ratio between input shaft 10 and output 12. An X indicates that the shift element must be engaged to establish the speed ratio. The (X) for selectable one-way-clutch 70 in 1st gear indicates that selectable one-way-clutch 70 may be in either the engaged state or the disengaged state in order to transfer power from the input shaft to the output shaft in 1st gear. To transfer power from the output shaft to the input shaft in 1st gear, selectable one-way-clutch 70 must be in the engaged state. Selectable one-way-clutch 70 must be in the disengaged state prior to shifting into 2nd gear.

TABLE 1

|  | 60 | 62 | 64 | 66 | 68 | 70 | Ratio | Step |
|---|---|---|---|---|---|---|---|---|
| Rev | X |  |  |  |  | X | -3.79 | 89% |
| 1st |  | X |  |  |  | (X) | 4.26 |  |
| 2nd |  |  |  | X | X |  | 2.73 | 1.56 |
| 3rd |  |  | X | X |  |  | 2.19 | 1.25 |
| 4th | X |  |  | X |  |  | 1.71 | 1.28 |
| 5th |  | X |  | X |  |  | 1.33 | 1.29 |
| 6th | X | X |  |  |  |  | 1.00 | 1.33 |
| 7th |  | X | X |  |  |  | 0.85 | 1.18 |
| 8th |  | X |  |  | X |  | 0.69 | 1.23 |

Controller 80 adjusts the states of each shift element by sending control signals. The torque capacities of shift elements 60, 62, 64, 66, and 68 are adjusted by sending electrical control signals 82 to valve body 84. In response, valve body 84 adjust the pressures in hydraulic circuits 86 routed to the respective shift elements. Controller 80 sets the state of selectable one-way-clutch 70 using electrical signal 88. Specifically, controller 80 sets current in an electrical circuit 88 above a threshold to engage selectable one-way-clutch 70 such that relative rotation is prevented in both directions. When the electrical current in circuit 88 is less than the threshold, one-way-clutch 70 is in a disengaged state in which carrier 32 and ring gear 48 are permitted to rotate in a forward direction (same direction as normal engine operation) but precluded from rotating in a negative direction.

Figure 2:
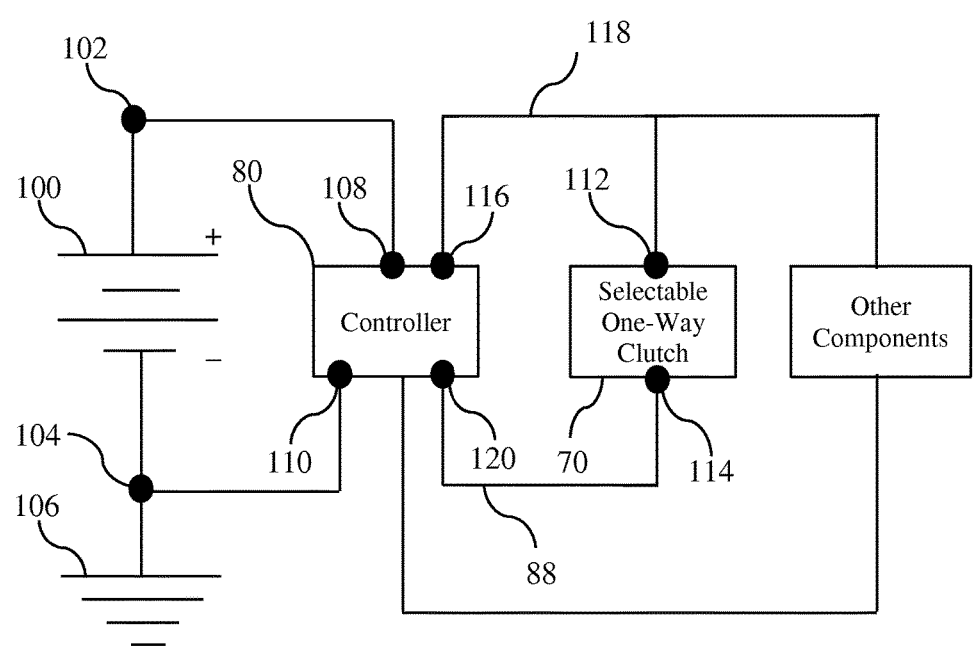
FIG. 2 is a schematic diagram of a first electrical circuit for controlling a selectable one-way-clutch.

FIG. 2 schematically illustrates an electrical circuit for controlling selectable one-way-clutch 70. Electrical power is provided by a battery 100 having a positive terminal 102 and a negative terminal 104. Alternatively, power may be provided by other types of electric power sources such as an engine driven alternator. The negative terminal 104 may be connected to a ground plane 106. Controller 80 receives electrical power by electrically connecting a power terminal 108 to the battery positive terminal 102 and connecting a ground terminal 110 to the battery negative terminal 104 or the ground plane 106. Selectabel one-way-clutch 70 enters the engaged state when current in excess of a threshold flows from terminals 112 to 114. Terminal 112 is connected to terminal 116 by wire 118 and signal wire 88 connects terminal 120 to terminal 114. Internal switches within controller 80 selectively connect terminal 108 to terminal 116 and selectively connect terminal 110 to terminal 120. These circuits may have specified resistances such that a desired level of current flows when the internal switches are closed. Wire 118 is used to provide electrical current to various other transmission components, such as solenoids in valve body 84, so the internal switches that selectively connect terminal 108 to terminal 116 are typically closed whenever the transmission is operating. In order to engage selectable one-way-clutch 70, controller 80 closes the internal switches that connect terminal 110 to terminal 120, providing a complete circuit through selectable one-way-clutch 70. To disengage one-way-clutch 70, controller 80 opens the internal switches that connect terminal 110 to terminal 120, preventing current from flowing through selectable one-way-clutch 70.

In addition to provided intended function when all components are connected and operating as designed, it is important to anticipate the types of error conditions that might occur and ensure that the consequences of such error conditions are not too severe. One type of error condition that may occasionally occur in an electrical control system is electrical connection of wires or components that are supposed to be electrically insulated from one another, called short circuiting. If a short circuit occurs between wire 88 and ground plain 106, then electrical current will flow through selectable one-way-clutch 70 whenever terminal 116 is powered. As mentioned above, since other components need power during many operating conditions, terminal 116 is powered whenever the transmission is operating. Consequently, selectable one-way-clutch 70 may be engaged even when the internal switches within controller 80 that are intended to engage it are open.

The consequences of unintended engagement of selectable one-way-clutch 70 depend upon the operating state of the vehicle when the error condition first occurs. If the unintended engagement occurs while the transmission is in reverse or in 1st gear with positive torque, then no change will be noticed until an upshift from 1st gear is attempted. When an upshift is attempted, selectable one-way-clutch 70 will not release properly, so the transmission will enter a tie-up state with loss of output torque. However, if the unintended engagement occurs while selectable one-way-clutch 70 is in an over-running condition, the sudden engagement will result in very abrupt speed changes of transmission components and very high torques imposed on transmission components. In some cases, the components may fail as a consequence of the stresses imposed.

Figure 3:
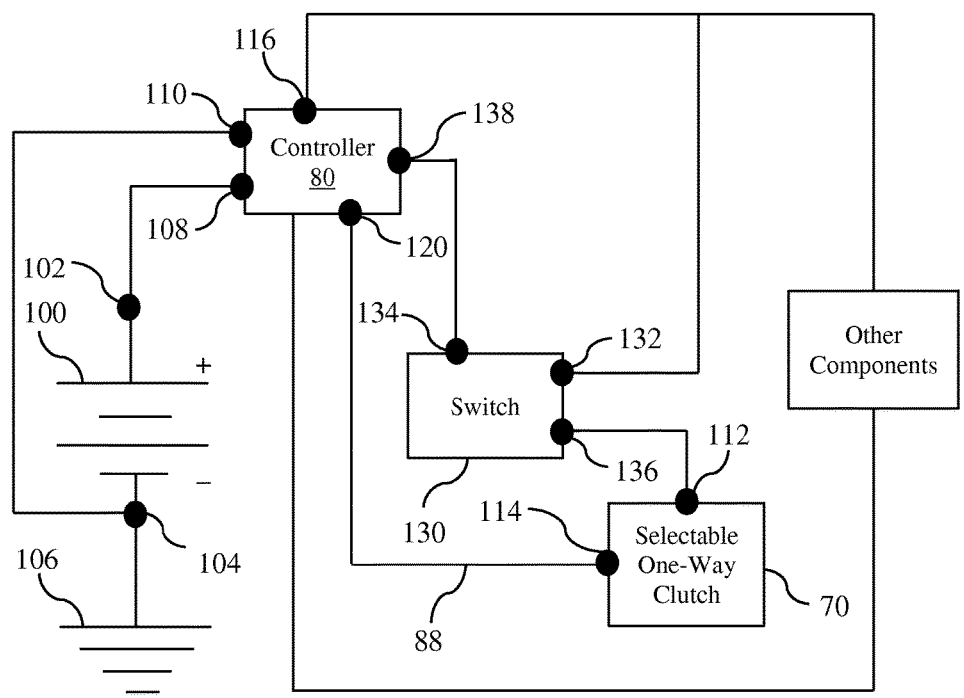
FIG. 3 is a schematic diagram of a second electrical circuit for controlling a selectable one-way-clutch.

FIG. 3 schematically illustrates an electrical circuit for controlling selectable one-way-clutch 70 that prevents the failure mode described above from occurring in the presence of any single short circuit. Switch 130 is interposed between terminal 116 of controller 80 and terminal 112 of selectable one-way-clutch 70. When a current above a threshold flows from terminal 132 to terminal 134, switch 130 electrically connects terminal 132 to terminal 136. When the current from terminal 132 to terminal 134 is below the threshold, on the other hand, switch 130 electrically disconnects terminal 132 from terminal 136. Terminal 132 is connected to controller terminal 116, terminal 136 is connected to controllable one-way-clutch terminal 112, and terminal 134 is connected to controller terminal 138. Like the circuit of FIG. 2, internal switches in controller 80 connect terminal 116 to terminal 108 during most transmission operating conditions. In order to engage selectable one-way-clutch 70, controller 80 closes internal switches to connect both terminals 120 and 138 to terminal 110. If terminal 138 is not connected to terminal 110, then switch 130 opens such that terminal 136 is not powered. Therefore, no current would flow through selectable one-way-clutch 70 even if a short circuit condition exists between wire 88 and ground plane 106. Similarly, if a short circuit occurs between terminal 134 and ground plane 106, then the circuit behaves the same as the circuit of FIG. 2.

Various types of switches may be utilized depending upon the magnitude of the current required to engage the selectable one-way-clutch. For relatively low current applications, transistors may be used. For higher current applications, relays may be used. The switch may be physically located near the selectable one-way-clutch, near the controller, or at an intermediate location. If the switch is integrated with the selectable one-way-clutch, then terminal 136, terminal 112, and the electrical connection between them may not be discrete identifiable components.

In FIG. 3, the powered terminal is shared among components while each component has a separately controlled ground terminal. Similar functionality could be achieved with a shared ground terminal and separately controlled powered terminals. In such an arrangement, it may be preferable to locate the switch on the ground (shared) side of the selectable one-way-clutch.

Figure 4:
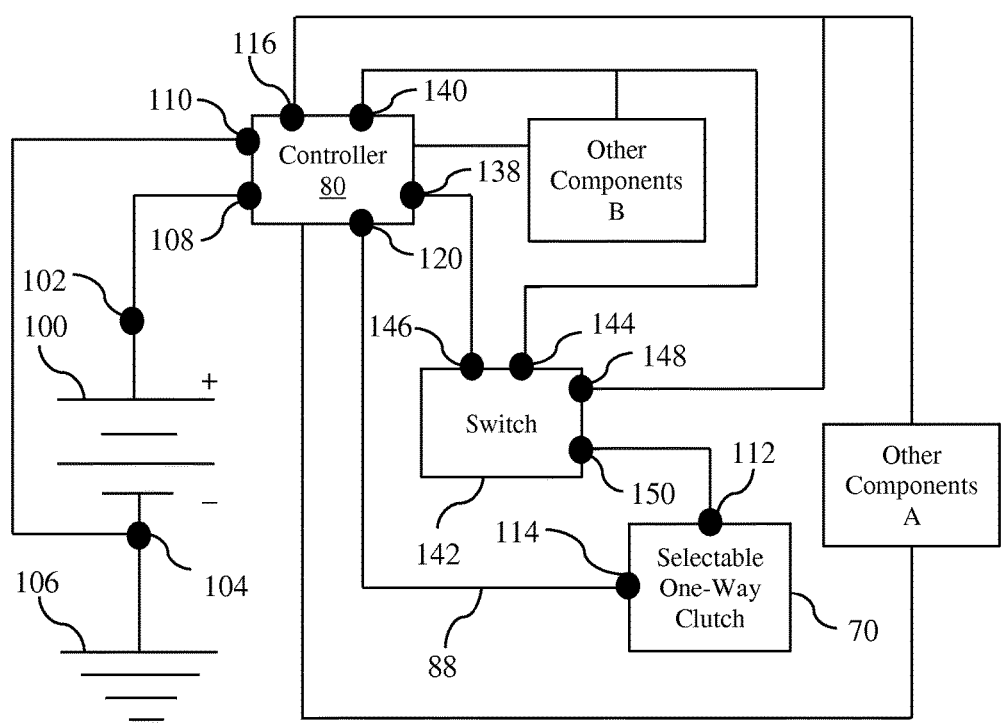
FIG. 4 is a schematic diagram of a third electrical circuit for controlling a selectable one-way-clutch.

FIG. 4 schematically illustrates another circuit for controlling selectable one-way-clutch 70. Although controller 80 may not have a sufficient number of separately controlled power terminals to provide separate power supplies for each transmission component, it may have more than one power terminal. In the circuit of FIG. 4, some transmission components receive electrical power via terminal 116 while other components receive electrical power via terminal 140. The components may be grouped such that some transmission functionality is available even if a failure disables one of the two terminals. Switch 142 is interposed between terminal 116 of controller 80 and terminal 112 of selectable one-way-clutch 70. When a current above a threshold flows from terminal 144 to terminal 146, switch 142 electrically connects terminal 148 to terminal 150. When the current from terminal 144 to terminal 146 is below the threshold, on the other hand, switch 142 electrically disconnects terminal 148 from terminal 150. Terminal 144 is connected to controller terminal 140, terminal 146 is connected to controller terminal 138, terminal 148 is connected to controller terminal 116, and terminal 150 is connected to selectable one-way-clutch terminal 112. Operation of the circuit of FIG. 4 is identical to operation of the circuit of FIG. 3.

Figure 5:
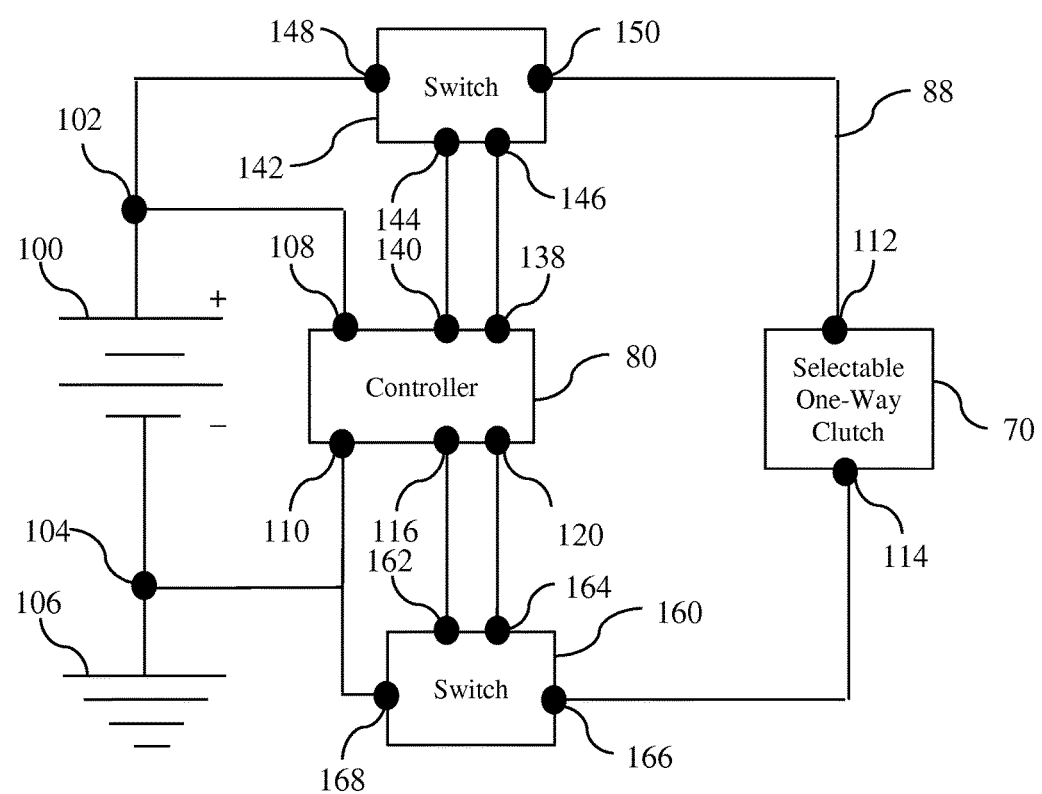
FIG. 5 is a schematic diagram of a fourth electrical circuit for controlling a selectable one-way-clutch.

FIG. 5 illustrates an alternative circuit that may be suitable when the electrical current required to engage the selectable one-way-clutch is high relative to the current draw of the controller. Terminal 148 of switch 142 is electrically connected to the positive terminal 102 of the battery 100. As with the circuit of FIG. 4, terminal 112 of the selectable one-way-clutch is powered whenever controller 80 internally connects terminal 138 to terminal 110 causing current to flow between terminals 144 and 146 of switch 142 to close the switch. A second switch 160 is utilized to selectively connect terminal 114 to ground plain 106. When current above a threshold flows between terminals 162 and 164, switch 160 closes to electrically connect terminal 166 to terminal 168. The current that engages selectable one-way-clutch 70 does not flow through controller 80. Controller 80 may be powered by the same power source as the selectable one-way-clutch as shown or may be powered from a different source of electrical energy.

Figure 6:
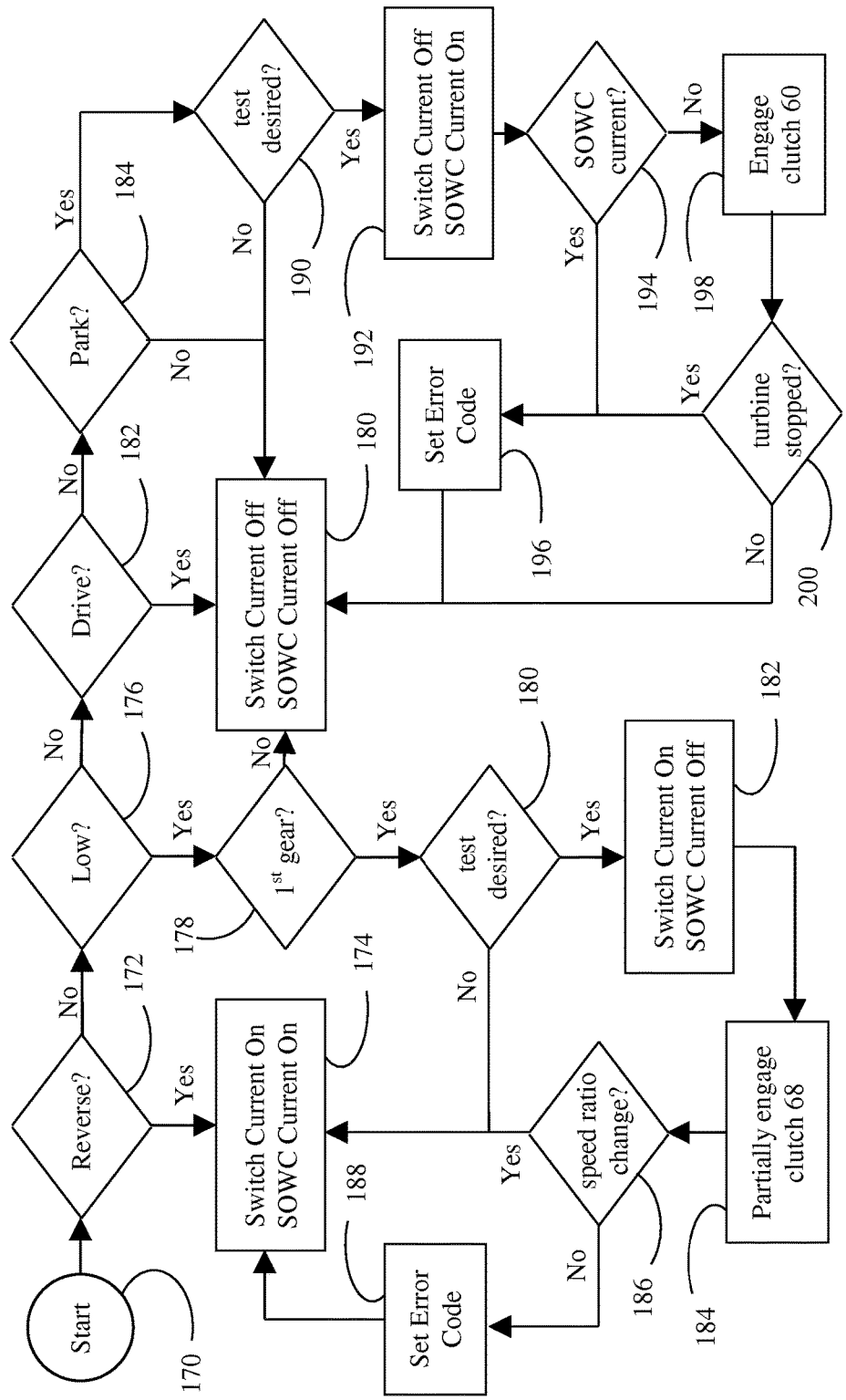
FIG. 6 is a flow chart for a method of controlling a selectable one-way-clutch.

FIG. 6 is a flow chart illustrating logic that may be used by controller 80 to switch and selectable one way clutch (or, in the case of FIG. 5, the two switches). Starting at 170, the controller first determines at 172 whether reverse is commanded. This is determined primarily based on a position of a shift selector which is manipulated by a driver. However, there may be some conditions in which reverse is not commanded immediately such as if the driver moves the shift lever to the reverse position while the vehicle is moving forward rapidly. If reverse is commanded, then, at 174, the controller sets both the switch current and the SOWC current above the required threshold to engage selectable one-way-clutch 70. If reverse is not commanded, the controller determines at 176 whether low range is commanded. In low range, the transmission should be configured to transmit negative torque, so SOWC 70 should be engaged when the transmission is in 1st gear and the torque is negative. If the transmission is not in 1st gear, as determines at 178, then the current in both circuits is set below the corresponding threshold at 180 to ensure that SOWC 70 is disengaged. Similarly, if the transmission is in drive, as determined at 182, then the SOWC is disengaged at 178 regardless of which forward gear is currently selected. If the transmission is not in park, as determined at 184, then the controller determines that it must be in neutral and disengages SOWC at 180.

Since the behavior of the system does not change in the presence of a single failure, such as a short circuit, it is likely that such as failure would go unnoticed. One a single failure has occurred, however, the system is no longer safe if an additional failure occurs. Therefore, it may be desirable to periodically check for the presence of a single failure. FIG. 6 illustrates several potential ways of accomplishing that. These tests may be carried out during operating conditions in which unintended engagement can be detected but would not cause damage. If the transmission is in low range and in 1st gear, the controller determines at 180 whether such a test should be conducted. Although illustrated in FIG. 6 in low range, the test could also be conducted in drive. The decision may be based on how much time has elapsed since the previous test. Also, if the torque is currently negative, then no test should be conducted. If no such test is desired, then controller immediately engages SOWC at 174 in the normal way. If a test is be conducted, then controller 80 sets one current above the threshold and the other below at 182. To test for a short between wire 88 and ground, the switch is turned on and the SOWC is turned off. To test for a short between terminal 146 and ground, the switch is turned off and the SOWC is turned on. If a short-circuit is present, the SOWC will be in an engaged state. Otherwise, it will be in a dis-engaged state. To determine whether the SOWC is engaged, the torque capacity of 68 is gradually increased at 184. If the SOWC is disengaged, the transmission ratio will begin to decrease as it would during a 1-2 shift which can be detected at 186. This process may be timed to coincide with a scheduled 1-2 shift such that the vehicle occupants will not notice as long as no error is present. If no ratio change occurs, then an error code is set at 188 to provide information to a service technician. The controller may take additional actions such as turning off power to terminals 116 or 140 or restricting the transmission to reverse and 1st gear.

Another opportunity to test for a single failure occurs at 190 while the vehicle is in park. Normally, while the vehicle is in park, no shift elements are engaged, including SOWC 70. If a test is desired, one of the currents is set above the threshold and one below at 192. If the switch is off and the SOWC is on, a short circuit would result in current at terminal 120. If the controller detects this at an error code is set at 196 and further error mitigation actions may be taken. If no current is detected, or if the controller is not capable of measuring this current, then the controller test whether SOWC is engaged by engaging clutch 60 at 198. While the transmission is in neutral, the turbine shaft will rotate at near the speed of the engine. If the transmission is shifted into a gear with the output shaft stationary, the turbine shaft will slow to a stop. If SOWC is disengaged, then the transmission will still be in a neutral state after engaging clutch 60. However, if the SOWC is engaged, engaging clutch 60 will place the transmission in reverse, causing the turbine shaft to stop which can be detected at 200.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    a selectable one-way-clutch configured to prevent relative rotation between two transmission elements in response to a first current exceeding a first threshold;
    a switch configured to interrupt the first current in response to a second current not exceeding a second threshold; and
    a controller configured to set a state of the selectable one-way-clutch in response to manipulation of a shift lever by manipulating the first and second currents.

2. The transmission of claim 1 wherein the selectable one-way-clutch is configured to permit relative rotation in only one direction in response to the first current being less than the first threshold.

3. The transmission of claim 2 further comprising:
    a first wire electrically connecting the controller to the selectable one-way-clutch; and
    a second wire electrically connecting the switch to the controller, the first current flowing through the first and second wires.

4. The transmission of claim 3 further comprising:
    a third wire electrically connecting the switch to the controller, the second current flowing through the second and third wires.

5. The transmission of claim 3 further comprising:
    a third wire electrically connecting the switch to the controller; and
    a fourth wire electrically connecting the switch to the controller, the second current flowing through the third and fourth wires.

6. The transmission of claim 3 wherein one of the two transmission elements is a non-rotating transmission case.

7. The transmission of claim 2 wherein the controller is programmed to:
    engage the selectable one-way-clutch in response to selection of a reverse range by setting the first and second currents to levels exceeding the first and second thresholds respectively; and
    dis-engage the selectable one-way-clutch in response to selection of a drive range by setting the first and second electrical currents to levels less than the first and second thresholds respectively.

8. The transmission of claim 7 wherein the controller is further programmed to test for a fault by:
    regulating one of the first and second electrical currents to a level exceeding the corresponding threshold;
    regulating another of the first and second electrical currents to a level less than the corresponding threshold;
    increasing a torque capacity of a friction clutch; and
    setting an error code in response to a transmission speed ratio being inconsistent with the selectable one-way-clutch being disengaged.

9. An electrically actuated clutch comprising:
first, second, third, and fourth terminals;
a switch configured to establish a circuit between the first and second terminals in response to a first current between the third and fourth terminals exceeding a first threshold; and
a one-way-clutch configured to preclude relative rotation between first and second races in response to a second current between the first and second terminals exceeding a second threshold.

10. A method of operating a transmission comprising:
in response to selection of a reverse range, engaging a selectable one-way-clutch by regulating a first and a second current to levels exceeding first and second thresholds respectively; and
in preparation for an upshift, dis-engaging the selectable one-way-clutch in one direction by regulating the first and second currents to levels less than the first and second thresholds respectively.

11. The method of claim 10 wherein the upshift is a shift from a launch ratio to a next highest forward speed ratio.

12. The method of claim 10 further comprising:
while regulating the first current to a first level exceeding the first threshold and regulating the second current to a second level less than the second threshold, increasing a torque capacity of a friction clutch; and
setting an error code in response to a transmission speed ratio being inconsistent with the selectable one-way-clutch being disengaged.

13. The method of claim 12 wherein the friction clutch is an on-coming clutch for the upshift and the transmission speed ratio does not change in response to increasing the torque capacity.

14. The method of claim 12 wherein the torque capacity of the friction clutch is increased while a transmission output shaft is stationary and a transmission turbine shaft slows down in response to increasing the torque capacity.

* * * * *